United States Patent [19]

Degen et al.

[11] Patent Number: 4,664,683

[45] Date of Patent: May 12, 1987

[54] SELF-SUPPORTING STRUCTURES CONTAINING IMMOBILIZED CARBON PARTICLES AND METHOD FOR FORMING SAME

[75] Inventors: Peter J. Degen, Huntington; Thomas C. Gsell, Glen Cove, both of N.Y.

[73] Assignee: Pall Corporation, Glen Cove, N.Y.

[21] Appl. No.: 823,063

[22] Filed: Jan. 27, 1986

Related U.S. Application Data

[63] Continuation-in-part of Ser. No. 603,669, Apr. 25, 1984, abandoned.

[51] Int. Cl.$^4$ .............................................. B01D 53/04
[52] U.S. Cl. ......................................... 55/387; 55/524; 210/502.1; 210/506; 264/122; 264/345
[58] Field of Search .................... 55/74, 387, 514, 524; 210/502, 506, 510; 264/122, 124–126, 345

[56] References Cited

U.S. PATENT DOCUMENTS

| | | | |
|---|---|---|---|
| 2,835,343 | 5/1958 | Wolff et al. ................................ | 55/74 |
| 2,920,050 | 1/1960 | Blacet et al. . | |
| 2,920,051 | 1/1960 | Wiig et al. . | |
| 3,048,537 | 8/1962 | Pall et al. ......................... | 264/126 X |
| 3,217,715 | 11/1965 | Berger et al. ...................... | 55/387 X |
| 3,297,805 | 1/1967 | Rottig et al. .......................... | 264/126 |
| 3,396,123 | 8/1968 | Urban . | |
| 3,403,202 | 9/1968 | Green et al. ..................... | 264/126 X |
| 3,474,600 | 10/1969 | Tobias .................................... | 55/524 |
| 3,531,558 | 9/1970 | Ganz .................................... | 264/122 |
| 3,538,020 | 11/1970 | Heskett et al. ..................... | 55/387 X |
| 3,544,507 | 12/1970 | Lloyd ................................. | 55/387 X |
| 3,611,678 | 10/1971 | Holden ................................... | 55/387 |
| 3,645,072 | 2/1972 | Clapham ............................. | 55/387 |
| 3,687,297 | 8/1972 | Kuhn et al. ........................ | 55/387 X |
| 3,715,869 | 2/1973 | Holden ................................... | 55/387 |
| 3,721,072 | 3/1973 | Clapham ............................. | 55/387 |
| 3,746,655 | 7/1973 | Urbanic . | |
| 3,801,400 | 4/1974 | Vogt et al. . | |
| 3,847,888 | 11/1974 | Baumgaertner ................. | 264/126 X |
| 3,864,277 | 2/1975 | Kovach ............................. | 423/449 X |
| 3,865,758 | 2/1975 | Yoshida et al. ..................... | 55/387 X |
| 3,919,369 | 11/1975 | Holden ............................. | 55/387 X |
| 3,925,248 | 12/1975 | Moroni et al. ..................... | 55/387 X |
| 3,971,373 | 7/1976 | Braun . | |
| 3,975,481 | 8/1976 | Baumgaertner ..................... | 264/126 |
| 4,000,236 | 12/1976 | Redfarn et al. ................... | 264/122 X |
| 4,013,566 | 3/1977 | Taylor ............................... | 55/387 X |
| 4,046,709 | 9/1977 | Yuki ................................. | 423/449 X |
| 4,046,939 | 9/1977 | Hart ................................. | 55/387 X |
| 4,062,368 | 12/1977 | Crellin et al. ..................... | 55/387 X |
| 4,102,816 | 7/1978 | Stalling et al. . | |
| 4,113,817 | 9/1978 | Kroger et al. ................... | 264/126 X |
| 4,131,544 | 12/1978 | Elahi ................................. | 55/387 X |
| 4,153,505 | 5/1979 | Ferguson .......................... | 55/387 X |
| 4,217,386 | 8/1980 | Avons et al. . | |
| 4,220,553 | 9/1980 | Krause ............................. | 264/122 X |
| 4,239,516 | 12/1980 | Klein ................................. | 55/387 X |
| 4,239,827 | 12/1980 | Notaro ............................. | 55/387 X |
| 4,242,226 | 12/1980 | Siren ................................. | 55/74 X |
| 4,272,264 | 6/1981 | Cullen et al. ......................... | 55/387 |
| 4,358,396 | 11/1982 | Bernstein et al. . | |
| 4,366,085 | 12/1982 | Ikegami et al. ................. | 423/210 X |
| 4,381,929 | 5/1983 | Mizuno et al. ..................... | 55/387 X |
| 4,399,052 | 8/1983 | Sugino ............................. | 423/445 X |
| 4,460,530 | 7/1984 | Hanson et al. ................... | 264/126 X |

*Primary Examiner*—Robert Spitzer
*Attorney, Agent, or Firm*—Leydig, Voit & Mayer

[57] ABSTRACT

A process for immobilizing reactive Whetlerite carbon particles and forming a self-supporting structure of high compressive strength therefrom is described in which the self-supporting structure substantially eliminates the formation of carbon fines while retaining the adsorption characteristics of the carbon particles. The process for immobilizing the adsorbent carbon particles in the self-supporting structure comprises the steps of:

(a) mixing in an environment having a relative humidity of less than about 35 percent, Whetlerite carbon particles, a major portion of which has particle sizes in the range of from about 200 to about 2,000 microns, with a powdered polymeric binding material, preferably a thermoplastic material having a solid-liquid transition stage, in an amount of about 5 to about 20 percent by weight, based on the weight of the total mixture, a major portion of the particles of the polymeric binding material having particle sizes in the range of about 8 to about 30 microns, to form a mixture of the carbon particles partially coated with the polymeric binding material;

(b) placing the mixture in a container of a desired shape; and (c) applying a pressure of up to about 400 psi while the mixture is contacted with an inert gas and is at an elevated temperature, this temperature being near the solid-liquid transition stage (when the polymeric binding material is a thermoplastic material), thereby forming the structure and immobilizing the particles.

24 Claims, No Drawings

SELF-SUPPORTING STRUCTURES CONTAINING IMMOBILIZED CARBON PARTICLES AND METHOD FOR FORMING SAME

This application is a continuation in part application U.S. application Ser. No. 603,669, now abandoned.

TECHNICAL FIELD

The present invention relates to filter structures in which adsorbent carbon particles are immobilized with a polymeric binding agent and to a process for forming the structures. More particularly, the present invention relates to a process for forming a self-supporting filter structure in which adsorbent carbon particles, preferably including carbon fines and carbon particles impregnated with metal compounds, are immobilized in a structure formed from a polymeric binding agent while the adsorption characteristics of the carbon particles are retained.

BACKGROUND ART

Adsorbent carbon, particularly activated carbon, is used extensively for a variety of purposes, many of which depend to a considerable extent on the large surface area and surface activity of the carbon particles. This adsorbent property of carbon is the basis for its use in many filter applications, including those for filtering and removal of certain fluids, particularly gases. The ability of adsorbent particles, particularly activated carbon particles to remove impurities from fluids, generally, and gases, such as air, in particular, has led to their extensive use in filters of varying types, including air conditioning filters, heating plant filters, gas masks and the like. Activated carbon, the material preferred for use in gas masks and the like, has an extremely high porosity and is characterized primarily by a very large specific surface area.

Although the manner in which a filter made of adsorbent, or activated, carbon retains substances which come in contact with the carbon particles is not fully understood, it is believed that retention occurs largely by means of physical sorption, chemical sorption and catalytic reactions. Specificity and efficiency of retention of certain substances has been shown to be increased by treatment of carbon particles with different metal compounds, such as in a process known as Whetlerizing, to produce activated carbon impregnated with such metal compounds, the product known as Whetlerite or ASC carbon. This type of metal compound-impregnated activated carbon is particularly useful in gas masks and the like where removal of toxic gases and biological materials is critical. In particular, Whetlerite is quite effective in removing hydrogen cyanide and cyanogen chloride. These gases are not removed by simple adsorption but react with the metal compounds present in the Whetlerite to produce non-toxic products.

Although highly effective in applications such as those indicated above, Whetlerite has been found to be prone to a loss of chemical reactivity toward such materials as hydrogen cyanide and cyanogen chloride. The loss of reactivity is most pronounced under conditions of elevated temperature, high humidity, and in the presence of oxygen. Thus, a relative humidity of about 65 to 100 percent and temperatures of about 80 degrees F. or higher for protracted periods of time result in loss of chemical reactivity toward hydrogen cyanide and cyanogen chloride gases. Contact with oxygen, particularly at concentrations of about 25 percent or greater at elevated temperatures, particularly at about 200 degrees F. or greater has been found to be especially detrimental to ASC carbon.

Some of the metal compounds employed in Whetlerite activated carbon, although having relatively low vapor pressures, are potentially toxic if inhaled or ingested. Some of these compounds, such as chromium salts, have been shown to be carcinogenic. In many instances, adsorbent carbon powder which has been treated with such metal compounds for use in gas masks and the like, may contain carbon fines either as a result of natural particle size distribution or from fines generation from handling during processing. When gas masks employing such treated adsorbent carbon powder are manufactured, there exists a potential danger of the metal salt impregnated carbon fines passing through the filter and being absorbed or inhaled by a person wearing such a gas mask. Thus, the wearer may avoid one health hazard only to face another potential health hazard. With such fines present in the filter of a gas mask, there is also the problem of inhalation of toxic material or toxins adsorbed by the fines in the filtration process.

DISCLOSURE OF INVENTION

The present invention provides structures and methods of producing such structures in which carbon fines already existing among carbon particles, particularly of Whetlerite, are immobilized within the structures and any tendency to form carbon fines is reduced or substantially eliminated. The present invention is directed to self-supporting structures in which adsorbent carbon particles, particularly of Whetlerite, including carbon fines, are immobilized within a polymeric matrix. The structures of the present invention substantially retain the inherent adsorption characteristics of the carbon particles with minimal increase in pressure drop across the structures as compared to similar cross-sections of non-immobilized adsorbent carbon particles. The self-supporting structures also provide resistance to compressive or deformation forces, a property lacking in non-immobilized carbon particles. This resistance is of sufficient magnitude such that the structures may be easily handled and transported without substantial loss of structural integrity or the production of fine carbon particles due to particle-particle abrasion.

In addition, when the carbon particles of the present invention are activated particles which include metal compounds such as silver, copper, and chromium compounds, i.e., Whetlerite, the process according to the present invention provides an immobilized structure which not only demonstrates flow properties which are substantially the same as free flowing, i.e., unbound, carbon particles having substantially the same particle sizes but also have chemical reactivity toward such toxic gases as cyanogen chloride which is substantially the same as free flowing Whetlerite carbon particles.

Thus, the self-supporting immobilized adsorbent carbon structures of the present invention are quite suitable for filtering a variety of gaseous and liquid materials and have potential application for numerous purposes, particularly as filter elements in cannisters of gas masks.

While not wishing to be bound by any particular theory, it is believed that many of the highly desirable physical properties of the structures of the present invention result from an interaction of the various particles, which begins with an attraction that is formed between the carbon particles and, in particular, the carbon fines, and the polymeric binder particles during the dispersing process. As a result of the attraction between the carbon and polymeric particles, the carbon fines are "scavenged" as aggregates with the polymeric particles. The fines subsequently become trapped or immobilized when the binder particles are softened during a heating step. The fines themselves appear to contribute an "adhesive" effect in binding one carbon particle to another. As a consequence, an increase in the compressive strength of the structure is provided while the adsorbent carbon fines are retained.

The present invention is also directed to a process for immobilizing adsorbent carbon particles, in particular Whetlerite particles, including scavenging fines thereof, and forming a self-supporting structure therefrom having the properties described above. Namely, the present invention results in the substantial elimination of mobility and loss, as well as further formation, of carbon fines while providing a structure with a relatively low pressure drop across the structure. In addition, the articles produced according to the present invention substantially retain the adsorption characteristics of carbon particles themselves and, when Whetlerite is used, its chemical reactivity as well. This process comprises the steps of:

(a) mixing in an environment having a relative humidity of less than about 35 percent Whetlerite carbon particles, a major portion of the particles having particle sizes in the range of from about 200 to about 2,000 microns, with a powdered polymeric binding material in an amount of about 0.5 to about 20 percent by weight, based on the total weight of the mixture, a major portion of the polymeric binding material having particle sizes in the range of from about 8 to about 30 microns, thereby forming a mixture of the carbon particles coated with the polymeric binding material;

(b) placing the mixture in a container of the desired shape; and (c) applying a pressure of up to about 400 psi while the mixture is contacted with an inert gas and is at a temperature corresponding to the solid-liquid transition stage of the polymeric binding material, resulting, when the polymeric binding material has cooled, in the self-supporting structure in which the adsorbent carbon particles are immobilized.

The invention described herein also contemplates a self-supporting structure with a low pressure drop and high compressive strength and, when Whetlerite is employed, also retains substantially the same chemical reactivity of free flowing Whetlerite, which is formed by the process described immediately above and comprises:

adsorbent carbon particles, a major portion of which has particle sizes in the range of from about 200 to about 2,000 microns;

about 0.5 percent to about 5 percent by weight, based on the weight of the adsorbent carbon particles, of carbon fines having particle sizes in the range of about 0.1 to about 50 microns; and about 0.5 to about 20 percent by weight of a polymeric binding material, the percentage based on the total weight of the mixture of polymeric binding material, carbon particles and carbon fines.

BEST MODES FOR CARRYING OUT THE INVENTION

Adsorbent Carbon

Although any form of adsorbent carbon is suitable for the present invention, particularly preferred is activated carbon. By activated carbon is generally meant a form of carbon which is characterized by an extremely large surface area and a very high adsorptive capacity for gases, typically in the form of charcoal, bone charcoal, sugar charcoal or very finely divided carbon derived from petroleum or vegetable matter. These materials are generally produced by the destructive distillation of wood, peat, lignite, bones, shells, etcetera. The carbonaceous matter is subsequently activated at an elevated temperature with steam or carbon dioxide, which brings about the porous nature of the carbon.

A major portion should have particle sizes in the range of about 200 to about 2,000 microns or about 80 to about 7 mesh, although it is generally preferred to use a narrower cut within this range, such as a 12×30 mesh or a 20×50 mesh carbon. With proper sieving of the carbon, the major portion generally constitutes 95 to 99.5 percent of the material. Most preferably, the average particle size of the carbon particles is about 1,000 to about 1,200 microns. If the average particle size is significantly larger than 2,000 microns, then a lesser amount of the polymeric binding or binder material is preferably used. However, there is a general correlation between the amount of binder used and the amount of fines which can be bound by the structure, i.e., reducing the amount of binder may reduce the quantity of fines which may be immobilized. If the major portion of particle sizes of the carbon is significantly smaller than the lower end of the range, more binder is required because of greater surface area and the risk of "blinding" or decreasing the porosity of the sorbent occurs. Although subject to variations depending on the source, the bulk density of the carbon employed is typically in the range of about 0.45 to about 0.62 g/cc, preferably about 0.48 g/cc. When a carbon having this latter value is used, the pressure employed in the compressive step frequently effects an increase in the bulk density from the preferred value, commonly to a value of about 0.52 to about 0.57 g/cc.

Among the preferred forms of the carbon employed in the present invention is one which is available as an activated carbon from Calgon Corporation, a subsidiary of Merck and Company. The carbon is designated as BPL 12×30 mesh and has an average particle size of about 1,200 microns.

Another preferred form of carbon which may be used in the instant invention includes Whetlerite carbon which may be obtained from a commercial source or prepared as needed. If prepared, prior to mixing with the thermoplastic material, the adsorbent carbon particles may be treated with metal compounds or metal complexes, such as copper, chromium and silver compounds, and complexes of such metals with compounds such as ammonia, in any conventional manner, as for example, by a process known as "Whetlerizing". Examples of such compounds include, but are not limited to, those effective in removing poisonous contaminants, particularly cyanogen chloride, from air, such as $NH_4HCrO_4$, $CuOHNH_4CrO_4$, $Cu_4(OH)_6CrO_4 \cdot xNH_3 \cdot yH_2O$ (brochantite chromate) and those disclosed in U.S. Pat. Nos. 2,920,050 and 2,920,051, which are incorporated herein by reference. Commercially available carbon treated with metallic compounds, such as Calgon ASC Whetlerized carbon, is suitable in the present invention if such material generally has the other properties of a suitable adsorbent carbon.

Polymeric Binding Material

As used herein, "polymeric binding material" refers to either a thermoplastic or thermosetting polymeric material, preferably synthetic, which is capable of being shaped under the process conditions of the present invention.

The term "thermoplastic material" describes the preferred polymeric binding material of the present invention and generally refers to any polymeric material having thermoplastic properties and may include any synthetic or semi-synthetic condensation or polymerization product. Preferably, the thermoplastic material is a homopolymer or copolymer of a polyolefin. Most preferable are polyethylene and polypropylene, the former being particularly preferred.

Other thermoplastic materials include polystyrene, polycarbonates, polyurethanes, phenoxy resins, vinyl resins derived from monomers such as vinyl chloride, vinyl acetate, vinylidine chloride, etcetera, including polyvinyl chloride, copolymers of vinylchloride with one or more of acrylonitrile, methacrylonitrile, vinylidine chloride, alkyl acrylate, alkyl methacrylate, alkyl maleate, alkyl fumarate, etcetera.

In some instances, to provide creep resistance, a thermosetting material may be preferred as the polymeric binding material. Suitable for this use are the type of cross-linked polyethylenes used as cable coatings, such as materials formed from blends of polyethylene with peroxide cross-linking agents, such as, for example, benzoyl or dicumyl peroxide present in catalytic amounts. Other examples include those materials in which a prepolymer is reacted with a cross-linking agent to form the product and includes polyurethanes of the type in which a "blocked" diisocyanate is reacted initially with a difunctional compound, such as a diol, to form the prepolymer which in turn is reacted with a trifunctional compound, such as a triol, to form, at the appropriate temperature, the cross-linked polymer. These thermosetting materials, which generally cross-link at temperatures between 100–200 degrees C., exhibit properties similar to the preferred crystalline thermoplastic materials discussed below.

The selection of polymeric binding material depends to some extent on the properties sought in the self-supporting structure which is formed in part from the binding material. That is, some of the mechanical properties of the immobilized carbon structure are determined by the physical properties of the binding material. If, for instance, a structure which flexes or which resists fracturing is desired, a thermoplastic powder should be used which is not fully crystalline or below its glass transition temperature at the temperature at which the article is used. Conversely, a rigid structure requires a more crystalline thermoplastic or thermosetting material.

A requirement of any material selected as the polymeric binding material for use in the present invention is that it have a sufficiently high viscosity at the processing temperature so as not to flow and "blind" or reduce the porosity of the active carbon, which porosity is necessary for effective adsorption. As described below, the heating step is conducted in such a manner as to cause the polymeric binding material to begin to soften so that the particles lose their original shape and become slightly tacky. The material should not, however, have a viscosity at the processing temperature such that it flows and blinding results.

A major portion of the particles of the polymeric binding material should have average particle sizes in the range of about 8 to about 30 microns. When the particle sizes are significantly larger than the upper limit of this range, the powder demonstrates a tendency to settle and a higher weight percentage is required. This may result, in some instances, in blinding. If particle sizes significantly smaller are used, there is also some tendency for blinding to occur.

When thermoplastic materials are used in the present invention, particularly preferred are polyethylene powders known commercially as Microthene FN500, FN510 and FN524, available from USI Chemicals. These powdered polyethylene powders differ somewhat from one another in density and Vicat softening point.

In addition, when a somewhat more flexible structure is desired, up to 10 percent of a second ethylenically unsaturated material, such as vinyl acetate, may be copolymerized with the ethylene to provide an amorphous thermoplastic binding material. A copolymer of this type exhibits less of a tendency to blind and also imparts some energy or shock absorbency properties to the immobilized carbon structure, thereby reducing the tendency of the structure to fracture when handled with less caution than that required by some of the structures using more crystalline homopolymers. A suitable material of this type comprising 9 percent vinyl acetate copolymerized with polyethylene is available from USI Chemicals as Microthene FN532.

The polymeric binding material is present suitably in an amount of about 0.5 to about 20 percent by weight, preferably 0.5 to about 9 percent by weight, and most preferably about 7 percent by weight, all percentages based on the weight of the mixture of polymeric binding material and carbon particles.

A preferred thermoplastic material is a low density polyethylene which is somewhat crystalline and has a Vicat softening point of about 195 degrees F. This material provides a somewhat rigid structure.

Self-Supporting Immobilized Carbon Structure

The self-supporting immobilized carbon structures of the present invention in their preferred form may generally be described as foraminous structures. That is, they do not have multiple macroscopic holes of a size visible to the human eye, albeit structures with a single macroscopic hole, such as an annular structure are contemplated as falling within the present structure. However, in any configuration used for the immobilized structures, there are no macroscopic voids which extend from an influent surface of the structure to the effluent surface thereof. Thus, even in an annular structure the surface of the structure defining the central hole would constitute either an influent or an effluent surface.

To form the self-supporting immobilized carbon structure of the present invention, adsorbent carbon particles are mixed with an appropriate amount, as indicated above, of polymeric binding material in any suitable manner. Mixing is conducted until uniformity is attained. It is usually unnecessary to use any particular precautions or undue care to avoid crushing the carbon during blending, which increases thereby the fines content, since the polymeric binding agent is capable of scavenging carbon fines. Some care should be employed, however, when the carbon particles already contain a large amount of fines, i.e., near or over 5 percent by weight based on the weight of adsorbent carbon particles. When Whetlerite is employed in the present invention, to obtain a product which has and maintains a high reactivity toward toxic gases such as cyanogen chloride and hydrogen cyanide, it is important to maintain the Whetlerite carbon particles in a dry environment, such as that having a relative humidity of less than 35 percent. Although the presence of moisture or high humidity has an adverse effect on the Whetlerite carbon and the finished immobilized structure, the effects of high humidity are particularly detrimental at any stage during processing prior to the heating step. This is particularly true during the mixing step. Once mixing has been completed and a substantially uniform mixture has been obtained, a portion of the mixture is transferred to a mold having the particular volume and shape desired.

It is preferred that the transfer of the mixture of carbon particles and binder be conducted to achieve maximum density of the immobilized structure. A high density is preferred for a number of reasons, among which are the reduction of channels in the immobilized structure, resulting in a loss in efficiency. When the structure is used in a gas mask, this could potentially allow higher concentrations of toxic gas to pass through the structure. A high density also allows a greater number of carbon particles and, when using Whetlerite carbon, a higher concentration of metal compounds. This results in a longer "gas life" or useful life in service. The higher density results in only marginally higher pressure drops across the immobilized structure. The density of the packed mixture obtained prior to heating and application of external pressure by the method described herein will vary depending upon the densities of the carbon and polymeric material. However, the minimum packed density of the mixture of carbon and polymeric material will typically be at least about 0.57 gm/cc. Preferably the density will be at least 0.60 gm/cc and most preferably 0.61 gm/cc.

While any technique may be used which is suitable to effect a high density of the mixture in the container, a preferred technique is one in which the particles of the mixture are packed by "free falling" in a manner such that the particles fall randomly into the container to achieve maximum packing of the particles. One method of providing the free falling phenomenon employs a long tube or cylinder arranged vertically over the container. Within the cylinder, spaced apart from one another, perpendicular to the longitudinal axis of the cylinder and located at approximately the middle to the bottom of the cylinder, are arranged a series of foraminate plates, such as sieves or mesh screens. The apertures are slightly larger than the largest particles found in the mixture. By way of example, if 1 to 1.5 mm diameter carbon particles are being packed, a mesh having an opening of about 5 mm diameter is employed. Generally, at least 3 and preferably 4 screens are employed. The screens are arranged so that the apertures of one screen are misaligned with respect to those of a next adjacent screen. Thus, each of the screens is rotated about the longitudinal axis of the cylinder by an amount sufficient to prevent a rod having approximately the diameter of the aperture from passing through all of the serially arranged screens. Generally, rotation through an angle of about 45 degrees from a position in which all of the apertures in successive screens are in alignment is preferred.

The space between adjacent screens depends, in part, upon the dimensions of the cylinder and screens employed as well as the particles of the mixture. Generally, the space should be at least three times the average diameter of the apertures of the screen. For particles and screens of the dimensions listed above, employing a cylinder having an overall length of about 24 inches and an I. D. of 4-$\frac{1}{8}$ inches, using 12×30 mesh carbon, the screens are spaced from one another a distance of about 1-1/2 inches.

To achieve maximum density of the mixture, the rate of pouring must also be adjusted to obtain "random filling characteristics". If the rate is too high, there appears to be an interaction of the particles with one another and the randomness is lost. For a cylinder having a diameter of about 4-$\frac{1}{8}$ inches, to deliver a depth of about 1 inch of mixture, sufficient mixture should be poured to achieve this depth in a time period ranging from about 5 seconds to about 1 minute. Other variables to be adjusted to provide maximum density are the height of the tube and, as indicated above, the number of screens and their spacing from one another.

Heat and pressure are then applied to the contents of the mold to provide an immobilized carbon structure, to impart compressive strength to the structure and, in some instances, indirectly, to reduce the potential for flaking of the structure and render it somewhat flexible. To immobilize the carbon particles, particularly carbon fines, the particles should be effectively bonded to one another by, or secured within, a matrix of polymeric binding material. Effective interparticle bonding and trapping of carbon fines occurs and the consequent increase in strength of the structure with minimal reduction of adsorptive properties or increase in pressure drop results when the carbon particles and fines are uniformly distributed in the self-supporting structure without blinding of carbon particles. This does not mean that each carbon particle or fine is completely enveloped in the polymeric binding material. On the contrary, it is preferred that each particle merely be held within the polymeric matrix and contact between adjacent carbon particles or fines is preferred. This may be accomplished by raising the temperature of the mixture to what has been referred to heretofore as the processing temperature to produce a suitable consistency in the polymeric binding material. Use of the proper temperature for a particular polymeric binding material causes that material to be softened and form a semi-solid or semi-liquid consistency. That is, the material is softened to the extent that no well defined particles exist which have the physical attributes of a solid yet the material does not flow as does a liquid. At this temperature or stage, termed herein as the "solid-liquid transition stage", which is about 50 to about 90 degrees Fahrenheit above the Vicat softening point, the polymeric binding material which existed at a lower temperature as separate particles merge to form a unitary matrix with an increased tackiness. This tackiness, probably resulting from increased mobility of the molecular chains of the molecules, provides improved interparticle carbon adhesion. The solid-liquid transition stage is not to be confused with a melting point in which solid and liquid phases exist in dynamic equilibrium with one another. At the solid-liquid transition stage, the polymeric binding material may be thought to be in a hybrid state between solid and liquid states. When at this stage, the mixture of thermoplastic material and carbon particles may be compressed sufficiently by application of pressure to decrease the distance between carbon particles, or increase the number of contact points between adjacent particles and increase interparticle bonding, providing thereby increased compressive strength with retention of adsorptive properties. The solid-liquid transition stage for a polymeric binding material is not as sharply defined as is the melting point of a pure crystalline material, and, in some instances, the temperature range of this stage is somewhat broad. However, it is still undesirable to use temperatures in the present process which are much above the temperature range of the solid-liquid transition stage since the polymeric binding material then exhibits the characteristics of a liquid in that it tends to readily flow. This is to be avoided since blinding of the pores of the carbon may occur and formation of a mass or block of coated carbon particles in which the adsorption and gas permeability characteristics have been reduced or lost may also result.

The heat required to raise the temperature of the mixture of polymeric binding material powder and carbon to the solid-liquid transition stage may be supplied by any conventional equipment, such as, for example, a forced hot air or convection oven, a heat jacketed mold, an infrared heater, a heated roller or rollers or by conducting a heated gas directly to the immobilized structure, particularly when the mold used is the canister for the final product. This is discussed in greater detail below. Depending on the apparatus used for heating the sample and the volume of the mold, heating to the solid-liquid transition stage may take from about 10 minutes to over an hour.

The compressive or crush strength of the self-supporting structures varies directly with the magnitude of the pressure applied during the forming step at the solid-liquid transition stage. Likewise, the pressure drop across the self-supporting structure varies proportionately with the magnitude of pressure applied to the carbon/polymeric binding material mixture during formation of the structure. However, although the pressure drop does increase somewhat within the suitable pressure range described herein, it increases significantly above this range, likely due to crushing of carbon and formation of additional fines.

When Whetlerite carbon is employed in the present invention, to avoid or substantially eliminate the diminution of reactivity toward toxic gases, such as cyanogen chloride and hydrogen cyanide, which commonly occurs during processing, heating is conducted in the presence of an inert gas, preferably in an anhydrous state. Suitable inert gases with which the Whetlerite may be contacted include nitrogen and the noble gases, such as helium, krypton, and argon. Any of the heating techniques discussed above may be used as long as they are performed in an inert gas atmosphere. A preferred technique is one in which the mold used to form the immobilized structure also serves as a canister for the completed product. In such a situation, the inert gas may be introduced to the canister directly.

Pressure may be supplied to the mold by placement between two pressure rollers (calendering), appropriate placement of a weight, or hydraulic means, such as by use of a piston, or by any other device and method known for application of pressure to a mold.

Although the compressive pressure may be applied before or during elevation of the temperature to the solid-liquid transition stage, it is preferred to raise the temperature to, or very close to, the solid-liquid transition stage where the thermoplastic material is soft and about to flow prior to application of pressure. Once the mixture is raised to the temperature of the solid-liquid transition stage and thermal equilibrium is established, pressure need be applied for only a brief period of time, i.e., less than 5 minutes being adequate and 1 to 2 minutes generally being sufficient.

Pressures in the range of up to the crush strength of the carbon, which is about 400 psi, are suitable although, from a practical perspective, pressures up to about 40 psi are preferred and from about 0.3 to about 10 psi are most preferred. That is, generally the compressive strength of the self-supporting immobilized structure is directly related to the pressure applied at the solid-liquid transition stage. For most purposes, very high compressive strengths are not required. Thus, by using lower pressures during the process, simpler equipment may be employed and a self-supporting structure having adequate strength, particularly compressive or crush strength, sufficient to permit ease of handling and transport, as well as minimum pressure drop across the structure and maximum adsorption characteristics, is achieved while substantially eliminating the formation of fines and retaining or immobilizing existing fines.

While the invention is susceptible to various modifications and alternative forms, certain specific embodiments thereof are described in the examples set forth below. It should be understood, however, that these examples are not intended to limit the invention to the particular forms disclosed but, on the contrary, the intention is to cover all modifications, equivalents and alternatives falling within the spirit and scope of the invention.

EXAMPLES

General Method for Preparation of Examples 1 To 8

Examples 1 to 8 were prepared by essentially the same procedure and specific differences in conditions or materials are noted below.

Portions of approximately 1,200 grams of Calgon BPL carbon having an average particle size of 1.2 mm, were weighed and combined, individually, in a 1 gallon, wide-mouth plastic container with 90 gram portions of Microthene FN Series polyethylene powder, available from USI Chemicals, having an average particle size between 8 and 30 microns to provide a 7 weight percent mixture of the polyethylene based on the total weight of the mixture. The carbon/polyethylene mixture was gently blended for 5 minutes in a roller mill to obtain a uniform mixture. Approximately 100 gram portions of the mixture were transferred to cylindrical aluminum molds, each having a height of 2 inches and a diameter of 4 inches, the top and bottom portions of the mold being formed from circular plates fitting within the cylinders. The filled molds were transferred to a convection oven and heated for periods of one-half to 1 hour until the final temperature corresponding to the solid-liquid transition stage was reached. The samples were removed from the oven and pressure was applied immediately by means of an hydraulic press. Thereafter, the cooled mixture of carbon and thermoplastic powder was removed from each of the molds and found to be self-supporting.

| Example | Polyethylene: Microthene FN # | Final Temperature | Compressive Pressure |
| --- | --- | --- | --- |
| 1 | 500 | 260 F. | 0.3 psi |
| 2 | 510 | 275 F. | 0.3 psi |
| 3 | 524 | 275 F. | 0.3 psi |
| 4 | 532* | 240 F. | 0.3 psi |
| 5 | 500 | 260 F. | 0 psi |
| 6 | 500 | 260 F. | 160 psi |
| 7 | 500 | 260 F. | 400 psi |
| 8 | 500 | 260 F. | 0.3 psi |

*ethylene-vinyl acetate copolymer

Microthene FN500 is a low density polyethylene. Microthene FN510 and FN524 each have higher densities and Vicat softening points than FN500. Microthene FN532 is a copolymer of ethylene and 9 percent, by weight, vinyl acetate and has a lower Vicat softening point than FN500.

The following tests were performed on the immobilized carbon structures formed in the above examples.

Cyclohexane Adsorption Test

The cyclohexane adsorption test is designed to measure the weight of cyclohexane which an activated carbon sample exposed to a saturated cyclohexane atmosphere will absorb during a period of time. Measurements are recorded at 30 second intervals until a stable reading is attained. The results are expressed in terms of grams of cyclohexane adsorbed per gram of carbon. A control consisting of an approximately equal weight of activated carbon of the same type as that used in the self-supporting immobilized carbon structures was used in each of the tests described below.

The test was performed as follows:

A small section (on the order to 30 to 80 mg) was removed from each of the samples formed as described in the General Method and was weighed on the pan of a Cahn Electrobalance Model G and remained on the balance pan within the balance case during the test. The precise weight of the sample was then recorded. A small pyrex dish having a height of one-quarter inch and a diameter of 2 inches, containing cyclohexane was placed one-half inch below the sample pan. A timer was set and the weight of the sample in the pan was recorded at 30 second intervals.

| Cyclohexane Adsorption (gm cyclohexane/gm carbon) | | |
| --- | --- | --- |
| Example | After 2 Minutes | Equilibrium Value |
| Control | 0.23 | 0.37 |
| 1 | 0.24 | 0.40 |
| 2 | 0.23 | 0.35 |
| 3 | 0.23 | 0.38 |
| 4 | 0.23 | 0.37 |

As the above results indicate, the self-supporting structures of immobilized carbon formed according to the present invention demonstrate adsorptive properties substantially identical to those of untreated activated carbon used as the control.

Compressive Strength Test

An Instron Model 1130 was used to determine the compressive strength of samples of the self-supporting immobilized carbon structures of the present invention. The test apparatus measures the force required to cause compressive failure of a sample and records such force in pounds per square inch. In using the device, cubes of sample material cut from the molded bodies described in the General Method and having dimensions 1×1×¾ inches were placed between two flat parallel plates, which plates were positioned in the jaws of the instrument. Upon actuation, a drive mechanism in the instrument causes the plates to move toward one another at a fixed rate until compressive failure of the sample occurs. The value at which failure occurs is then recorded as the compressive strength of the sample.

| Example | Compressive Strength (Pounds/Square Inch) |
| --- | --- |
| Control | 0 |
| 5 | 9 |
| 6 | 41 |
| 7 | 103 |

Dust Release Test

The Dust Release Test is designed to measure the amount of carbon particles lost from a sample when subjected to a constant vibration.

The apparatus used to perform the test consists of three cylinders placed with their openings in series and secured to one another by a clamp. Rubber gaskets are used to separate each of the cylinders. In the first cylinder, a high efficiency Emflon ® air filter manufactured by Pall Corporation is included and in the third or last cylinder a nylon 66 collection membrane having a 0.8 μm absolute pore rating is located. In the intermediate or second cylinder is placed the sample being tested, cut from a section of the structure formed according to the General Method. A 200 mesh screen separates the second and third cylinders so that only fine particles are transferred between cylinders. The cylinders are secured to a vibrating dental table which is adjusted to provide a vibrating force of 4 G. Additionally, a vacuum for drawing air through the cylinders at a specified flow rate from the high efficiency air filter cylinder in the direction of collection is provided.

The test was performed by placing a sample of the self-supporting immobilized carbon structure of the present invention weighing about 30 grams in the second or sample cylinder.

The nylon 66 membrane was weighed and mounted in the collection cylinder. The cylinders were then clamped together and secured to the table. Vibration and air flow through the apparatus were initiated simultaneously, the air flow rate being adjusted to 8 liters per minute.

The test was conducted for 60 minutes, after which the collection membrane was removed and reweighed, the difference being the amount of carbon lost by the sample.

| Example | Carbon Loss |
| --- | --- |
| Control | 7 mg |
| 8 | less than 0.001 mg |

As the above results indicate, loose carbon particles (as, for example, the control test) contain or release large amounts of dust or fines. However, carbon particles retained in immobilized form as in Example 8 release a substantially lower or immeasurable quantity of carbon fines or dust.

Cyanogen Chloride Removal Test: Effects of Moisture and Oxygen

Sample Preparation

Samples were prepared in a manner substantially similar to that described above in the general method. A 600 gram portion of Whetlerite ASC carbon from Calgon Corporation, having an average particle size of 1.2 mm, was weighed and placed in a round, wide-mouth plastic container with 18 grams of Microthene FN500 polyethylene powder, to provide a 3 percent mixture, based on the total weight of the mixture. The powder had an average particle diameter of between 8 and 30 microns. After blending in a roller mill for about 5 minutes to obtain a uniform mixture, 154.5 grams of this mixture was transferred to an aluminum alloy canister having a diameter of 4.125 inches as described in Example 11 below. The canister was filled to a bed depth of 1.125 inches. A plate conforming to the internal diameter of the canister was placed in the canister and a compressive load of about 15 psi was applied. While restrained in the canister in this manner, the test samples were subjected to conditions outlined below and subsequently tested for cyanogen chloride (CK) removal.

In Example 9, a sample bed was exposed to a high relative humidity prior to heating to determine whether the absence of moisture or high relative humidity during processing at a stage prior to the application of heat results in better CK removal. In another experiment, described in Example 10, heating was conducted either in the presence of air or an inert gas, in this instance specifically nitrogen to assess whether an inert atmosphere during heating results in a longer gas life.

Test Method and Conditions for Cyanogen Chloride Removal Test

The cyanogen chloride removal test consists of challenging a Whetlerite carbon bed with a gas stream containing CK and subsequently measuring the effluent from the carbon bed for the presence of CK. The test is performed at a relative humidity of 80 percent and employs an intermittent flow which simulates a human breathing pattern. The test parameters are:

| | |
|---|---|
| Inlet Concentration of CK | 4 mg/liter |
| Outlet Concentration of CK | 0.008 mg/liter (maximum) |
| Flow Rate | 50 liters/min |
| Relative Humidity | 80% |
| Temperature | 80 ± 10 F. |

The inlet and outlet concentrations of CK were determined using "wet" chemical analytical methods well known to those skilled in the art. Each test sample was pre-equilibrated with air at 80 degrees relative humidity prior to testing. The test bed was then attached to the test stand and the test conducted until the effluent concentration reached 0.008 mg/liter of CK. The time elapsed until this concentration was reached, known as the "gas life" of the immobilized structure, was then recorded as the "CK Lifetime".

EXAMPLE 9

Effect of Moisture on Immobilized Whetlerite Samples

Four samples were prepared in the manner indicated above under "Sample Preparation". Two of the samples were exposed to a relative humidity of about 80 percent for about 24 hours prior to heating. The remaining two samples were kept in an environment which was maintained at a relative humidity of less than 30 percent. Both samples were then heated with a nitrogen stream maintained at a temperature of 240 degrees F. passing through the filter bed for a period of 5 minutes. The velocity of the hot nitrogen stream was 100 feet per minute. A control was also run with the other samples. The control employed the same amount of carbon used in the other samples, but did not contain any polymeric binder. It was exposed to a relative humidity of less than 30 percent, like samples C and D, and was packed in the same manner. However, the control sample was not heated. Each of the samples was tested for CK removal by the procedure described above.

| Sample | Relative Humidity | CK Lifetime |
|---|---|---|
| A | 80% | 6.5 min |
| B | 80% | 7.0 min |
| C | <30% | 45.8 min |
| D | <30% | 47.0 min |
| Control | <30% | 48.0 min |

EXAMPLE 10

Effect of Oxygen During Heating

Four samples containing Whetlerite carbon were prepared as indicated above. Two of the samples were heated to the solid-liquid transition temperature with hot nitrogen and the two remaining samples were heated with hot air. All of the samples were maintained in an environment of less than 30 percent relative humidity during processing steps prior to heating. The gases employed were heated to a temperature of about 240 degrees F. A control sample which was essentially the same as that used in Example 9 was prepared and used in the instant example, employing nitrogen as the heated inert gas. The CK removal test was conducted as indicated above.

| Sample | Gas | CK Lifetime |
|---|---|---|
| A | Air | 34.0 min |
| B | Air | 30.0 min |
| C | Nitrogen | 47.5 min |
| D | Nitrogen | 46.0 min |
| Control | Nitrogen | 48.0 min |

EXAMPLE 11

Packing Technique to Achieve Maximum Density

For each canister prepared, a cylindrical tube having an internal diameter of 4.125 inches was placed above the opening of the canister also having a diameter of 4.125 inches. Cylindrical tubes having lengths of 12, 24, and 36 inches were arranged with their walls oriented in a vertical direction. Each of the tubes was provided with three screens arranged horizontally within the cylindrical tube from about the middle of the tube to the bottom. Each of the screens had 5 mm diameter openings and was spaced from one another by 1-½ inches. The screens were turned through an angle of about 45 degrees with respect to the next adjacent screen such that no two screens in the series had apertures which were in alignment.

A mixture of 150 grams of Calgon ASC Whetlerite carbon and 4.5 grams of Microthene FN532 ethylenevinyl acetate copolymer powder were combined and mixed as indicated in the general method. The canister in each test was filled to a predetermined height (from which the volume was calculated) at a rate varying from 0.25 to about 5 lb/min. The mixture of Whetlerite carbon and binder was added to the cylindrical tube through a filter. The results which are presented below represent an average of three determinations.

| Sample | Tube Length (inches) | Rate of Filling (lb/min) | Bed Depth (cm) | Density (gm/cc) |
|---|---|---|---|---|
| A | 36 | 0.25 | 2.84 | 0.630 |
| B | 36 | 1.0 | 2.86 | 0.626 |
| C | 36 | 5.0 | 2.95 | 0.607 |
| D | 12 | 0.25 | 2.92 | 0.613 |
| E | 12 | 1.0 | 3.11 | 0.576 |
| F | 24 | 0.25 | 2.85 | 0.628 |
| G | 24 | 1.0 | 2.90 | 0.617 |

Industrial Applicability

The immobilized carbon structures of the present invention may be used in filters for filtering fluids, either gases or liquids, of various types. The immobilized carbon structures, especially those containing Whetlerite carbon, are particularly suited to filters employed in gas masks.

We claim:

1. A process for immobilizing reactive Whetlerite carbon particles and forming a self-supporting, dust-free structure of high compressive strength therefrom, thereby substantially eliminating the formation of carbon fines while retaining the reactivity and adsorption characteristics of said Whetlerite carbon particles, comprising the steps of:
   (a) mixing in an environment having a relative humidity of less than about 35 percent, Whetlerite carbon particles, a major portion of which has particle sizes in the range of from about 200 to about 2,000 microns, with a powdered thermoplastic material in an amount of about 0.5 to about 20 percent by weight, based on the weight of the total mixture, a major portion of the particles of said thermoplastic material having particle sizes in the range of about 8 to about 30 microns but not greater than 275° F., to form a dry mixture of said carbon particles partially coated with said thermoplastic material;
   (b) placing said mixture in a container of the desired shape; and
   (c) applying a pressure of up to about 40 psi while the mixture is contacted with an inert gas and is at a temperature corresponding to the solid-liquid transition stage of the thermoplastic material, thereby forming said structure and immobilizing said particles.

2. The process of claim 1 wherein said temperature is 50 to 90 degrees Fahrenheit above the Vicat softening point of said thermoplastic material.

3. The process of claim 1 wherein the percentage by weight of said powdered thermoplastic material is 7 percent based on the weight of the total mixture.

4. The process of claim 1 wherein a major portion of the particles of said thermoplastic material has particle sizes in the range of about 15 to about 20 microns.

5. The process of claim 1 wherein the pressure applied to said mixture is about 0.3 to about 10 psi.

6. The process of claim 1 wherein the thermoplastic material comprises a polyolefin.

7. The process of claim 6 wherein the polyolefin comprises polyethylene.

8. The process of claim 1 wherein the thermoplastic material comprises a copolymer of polyolefin and a second ethylenically unsaturated substance.

9. The process of claim 1 wherein activated carbon particles are used to form said reactive Whetlerite carbon particles.

10. The process of claim 1 wherein said thermoplastic material is polyethylene, a major portion of which has particle sizes in the range of about 15 to about 20 microns and is present in an amount of about 7 percent by weight, based on the weight of said carbon particles, and a pressure of about 40 psi is applied to said mixture while contacted with an inert gas at a temperature of about 50 to about 90 degrees F. above the Vicat softening point of the thermoplastic material.

11. The process of claim 1 wherein said mixture is placed in said container in a density maximizing manner.

12. The process of claim 11 wherein said mixture is placed in said container in a manner to achieve a density of at least about 0.60 gm/cc.

13. The process of claim 1 wherein the thermoplastic material comprises a polyethylene having a Vicat softening point of about 190° F.;

14. A process for immobilizing reactive Whetlerite carbon particles and forming a self-supporting, dust-free structure of high compressive strength therefrom, thereby substantially eliminating the formation of carbon fines while retaining the reactivity and adsorption characteristics of said Whetlerite carbon particles, comprising the steps of:
   (a) mixing in an environment having a relative humidity of less than about 35 percent, Whetlerite carbon particles, a major portion of which has particle sizes in the range of from about 200 to about 2,000 microns, with a powdered polymeric binding material in an amount of about 0.5 to about 20 percent by weight, based on the weight of the total mixture, a major portion of the particles of said polymeric binding material having particle sizes in the range of about 8 to about 30 microns, to form a dry mixture of said carbon particles partially coated with said polymeric binding material;
   (b) placing said mixture in a container of the desired shape; and
   (c) applying a pressure of up to about 40 psi while the mixture is contacted with an inert gas and is at an elevated temperature, thereby forming said structure and immobilizing said particles.

15. A self-supporting, immobilized carbon structure substantially free of mobile carbon fines having a low pressure drop and high reactivity for toxic gases comprising:
   Whetlerite carbon particles, a major portion of which has particle sizes in the range of from about 200 to about 2,000 microns;
   about 0.5 to about 5 percent by weight, based on the weight of said Whetlerite carbon particles, of immobilized carbon fines; and
   about 0.5 to about 20 percent by weight of a thermoplastic material, the percentage of said thermoplastic material based on the total weight of the mixture of thermoplastic material, Whetlerite carbon particles and carbon fines, said self-supporting, immobilized carbon structure having a density of at least about 0.57 gm/cc.

16. The self-supporting structure according to claim 15 wherein the particle sizes of said carbon fines in the range of about 0.1 to about 50 microns.

17. The self-supporting structure according to claim 15 the percentage by weight of said powdered material is 7 percent.

18. The self-supporting structure according to claim 15 wherein the thermoplastic material comprises a polyolefin.

19. The self-supporting structure according to claim 18 wherein the polyolefin comprises polyethylene.

20. The self-supporting structure according to claim 19 wherein said polyethylene has a Vicat softening point of about 195° F.

21. The self-supporting structure according to claim 15 wherein the thermoplastic material comprises a copolymer of polyolefin and a second ethylenically unsaturated substance.

22. The self-supporting structure according to claim 15 wherein activated carbon particles are used to form said Whetlerite carbon particles.

23. The self-supporting structure according to claim 15 wherein the density of said self-supporting structure is at least about 0.60 gm/cc.

24. A self-supporting, immobilized carbon structure substantially free of mobile carbon fines having a low pressure drop and high reactivity comprising:

Whetlerite carbon particles, a major portion of which has particle sizes in the range of from about 200 to about 2,000 microns;

about 0.5 to about 5 percent by weight, based on the weight of said Whetlerite carbon particles, of immobilized carbon fines; and about 0.5 to about 20 percent by weight of a polymeric binding material, the percentage of said polymeric binding material based on the total weight of the mixture of polymeric binding material, Whetlerite carbon particles and carbon fines, said self-supporting structure having a density of at least about 0.57 gm/cc.

* * * * *